March 17, 1970  W. E. KREUZ ET AL  3,500,733
AERIAL CAMERA
Filed Sept. 19, 1967  6 Sheets-Sheet 1
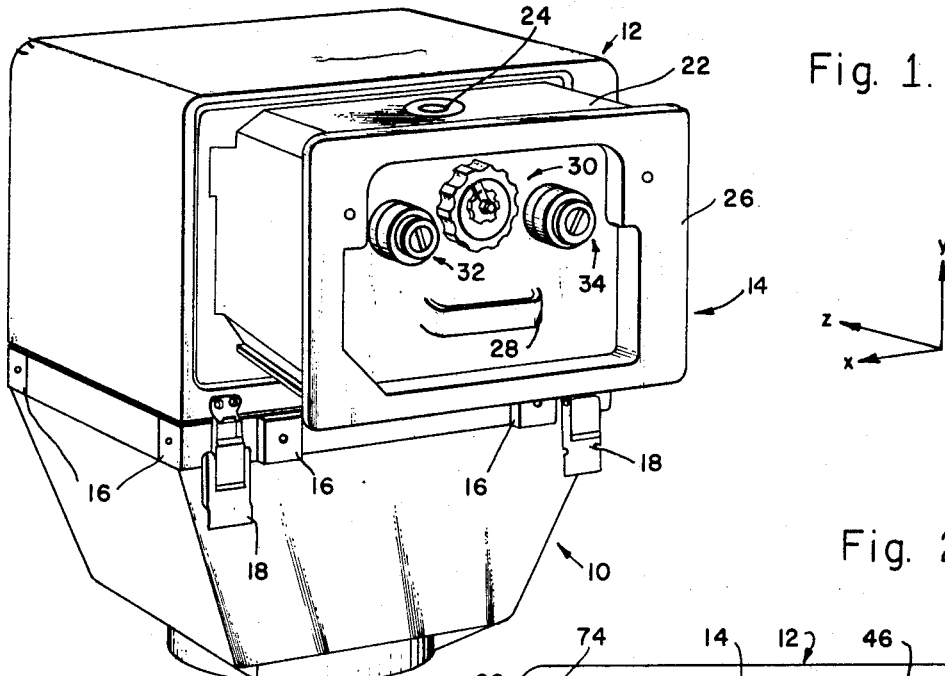
Fig. 1.
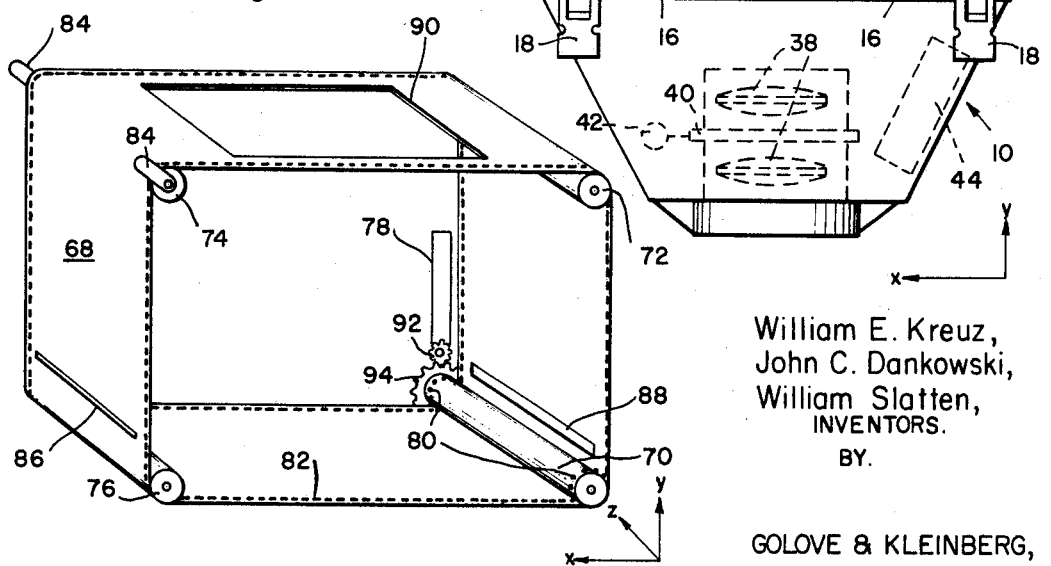
Fig. 2.
Fig. 3.
William E. Kreuz,
John C. Dankowski,
William Slatten,
INVENTORS.
BY.
GOLOVE & KLEINBERG,
ATTORNEYS.

March 17, 1970   W. E. KREUZ ET AL   3,500,733
AERIAL CAMERA

Filed Sept. 19, 1967   6 Sheets-Sheet 3

March 17, 1970  W. E. KREUZ ET AL  3,500,733
AERIAL CAMERA
Filed Sept. 19, 1967  6 Sheets-Sheet 5
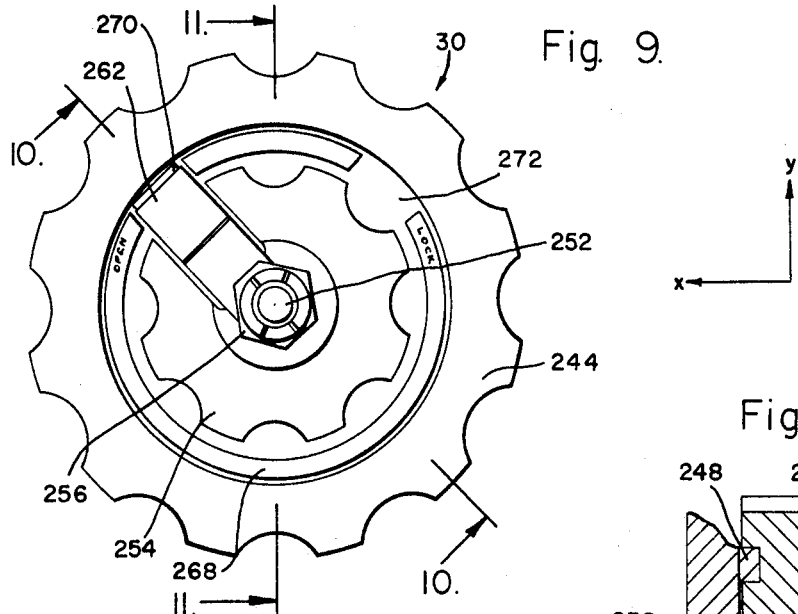
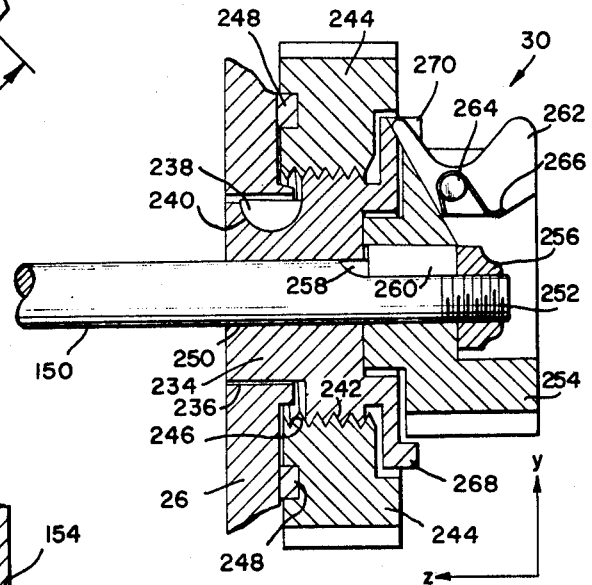
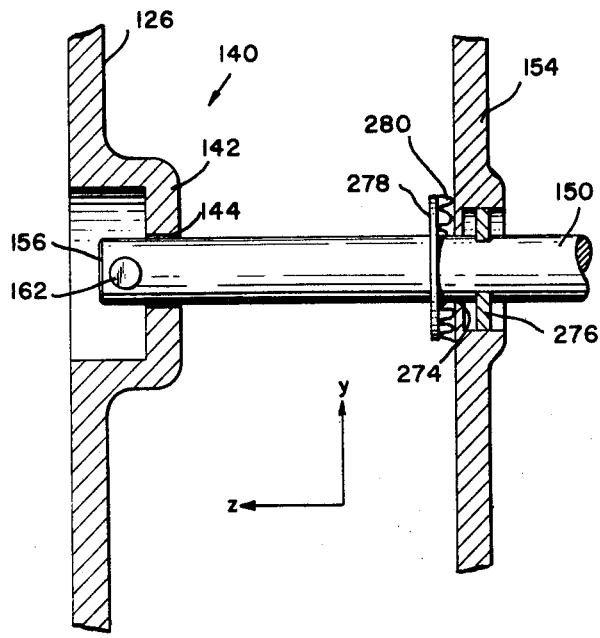

3,500,733
AERIAL CAMERA
William E. Kreuz, Pasadena, John C. Dankowski, El Monte, and William Slatten, Duarte, Calif., assignors to Hycon Mfg. Company, Monrovia, Calif.
Filed Sept. 19, 1967, Ser. No. 668,803
Int. Cl. G03b 29/00
U.S. Cl. 95—12.5   7 Claims

ABSTRACT OF THE DISCLOSURE

An aerial camera having an easily removable film magazine containing film transport apparatus, including an easily operable magazine locking device which, in combination with a pair of locking wedge devices, secures the magazine within the camera in all directions. The film spools are held in the magazine by means of a pair of spool holders which are easily operable for locking the spools therein, and for releasing the spools from the magazine when desired. The camera further includes a focal plane shutter having an endless loop curtain which peripherally traverses the magazine.

---

This invention relates to aerial cameras, and more particularly to an aerial camera having an easily replaceable film magazine which is interchangeable with similar magazines for rapid film changeover.

The recognition of the inherent intelligence capabilities of aerial photography has resulted in the development of sophisticated aerial cameras, which in turn have become the dominant tools of surveillance and reconnaissance programs. The function of such a camera is to take high resolution photographs of terrain targets, while being carried by an an aircraft. For maximum utility, the camera must be operable so that the photographs may be taken in rapid succession, and the speed of camera operation should be adjustable so that consecutive photographs show portions of the terrain which overlap in the direction of aircraft flight.

The increased popularity of aerial surveillance in reconnaissance missions, and as an adjunct to other aircraft missions, has signalled a need for the development of a reliable and economical aerial camera which can be operated by persons unskilled in photographic procedures. One recurring camera procedure during a photographic mission concerns the reloading of film in the camera, after a previous film supply has been exhausted.

A continuously operated aerial camera can exhaust its supply of film in a very short period of time. For example, an aerial camera which is equipped with a 500 foot supply of film, continuously taking photographs 4½ inches square with ¼ inch margins at a rate of 4 exposures per second, will expose its entire capacity of 1200 frames within 5 minutes. Correspondingly, a camera equipped with a 100 foot supply of film will exhaust the supply in 1 minute.

Many aerial cameras do not have provision for reloading in flight, so that alternate cameras must be employed if the surveillance mission is to be extended. Other cameras include an inflight reloading capability, but certain practical problems are attendant to the reloading procedures utilized. The most convenient inflight method of reloading an aerial camera, currently employed, utilizes interchangeable film cassettes which are removable from the camera. An inventory of film supply cassettes, individually darkroom loaded with live film, is carried in the aircraft. When the camera film supply has been exhausted, the film take-up cassette containing the exposed film is removed from the camera, and the empty supply cassette is removed from its supply position on the camera and replaced on the camera in the film take-up position, for service as a take-up cassette. A live film supply cassette is thereupon placed in a supply position on the camera, providing a leader which must be threaded in a predetermined configuration to engage various components of the film drive and hold-down mechanisms, and ultimately into the take-up cassette.

A major problem concerning the interchangeable cassette procedure of inflight film loading is a practical one, arising from the frequent necessity of employing personnel unskilled in camera procedures to operate the camera. On such occurrences, film loading proceeds with substantial difficulty, often resulting in errors which produce camera malfunction or inoperativeness. For example, even though detailed loading instructions may be included for the benefit of personnel unfamiliar with the loading procedure, the film may be threaded incorrectly, or may be inserted backwards, or may be inserted in such manner as to jam the camera. These and other errors, if finally corrected, can unnecessarily expose, or "fog," significant lengths of film. Further, in instances of severe operator frustration, mechanical or electrical connections may be disturbed, causing the camera to become inoperative or to malfunction such as by causing the various film driving components to lose synchronization.

Another problem in film loading techniques of the prior art concerns a long period of time involved in film changeover. Even with a skilled operator, the amount of time during which the camera is inoperative can have significant consequences in a reconnaissance mission, resulting in unfortunate loss of photographic opportunities. If small capacity cassettes are utilized, more time may be spent in loading the camera than in taking photographs.

A third problem concerns the limited versatility of the prior art cameras in the selection of different film types. For example, it is often desired to change the film in the camera to a different type of film, such as from conventional black and white film to infra-red or color film. In the prior art cameras, it is not possible to change film types without cutting the film in the camera unless the film in the supply cassette has been exhausted. When film changeover is performed, the problems noted above are presented.

The aerial camera according to the present invention avoids the problems described above, by providing means for easily and rapidly interchanging film supplies inflight, without the necessity for rethreading the film leader through the film drive and hold-down mechanisms. This film changeover feature of the camera is characterized by a removable magazine, containing the film supply and take-up spools in addition to the film drive and hold-down mechanisms, which can be easily and rapidly interchanged with similar magazines. Each such magazine is loaded with film, in the darkroom prior to aircraft flight, and the darkroom loading procedure includes complete threading of the film leader. The magazine is then rendered light-tight by placing thereon a light-impervious magazine cover, which remains in place until removed for withdrawal of the film from the magazine for developing. Since all film maneuvers during camera operation are accomplished within the removable magazine, it is not necessary that the film supply from an in-use magazine be exhausted before magazine changeover can proceed, so that different film types can be conveniently interchanged; furthermore, a removed magazine having a partial film supply may be reinserted at a later time.

The present camera is further characterized by a novel shutter of the focal plane variety. The shutter includes a light-impervious curtain describing an endless loop about the periphery of the magazine compartment, and at least one opening is provided therein for exposing the film situated in the camera focal plane. The arrangement of the shutter curtain provides a high curtain speed capability, while restricting curtain inertia. In a preferred shutter embodiment, the shutter curtain contains two narrow slits of different widths, for producing two shutter speeds during daylight, and a rectangular opening or wide slit for nighttime photography. The shutter has a bi-directional capability, the position of a particular curtain opening is sensed by appropriate sensing means, and a particular curtain opening may be selected for traversing the camera focal plane to provide a choice of effective shutter speeds. Because the shutter curtain describes a continuous loop, the curtain serves a capping function between exposure intervals, so that a separate capping curtain is not required.

The present concept of an endless loop shutter curtain revolving about the film supply and transport apparatus, and the provision for a plurality of separately operable exposure openings, are significant advances over focal plane shutters in the prior aerial camera art. In the past, for example, focal plane shutters were typically comprised of a finite length of a light impervious curtain containing an exposure slit therein, and a pair of alternatively driven rollers for storing a portion of the curtain length while driving the exposure slit across the camera focal plane. Another type of shutter is comprised of an endless loop curtain, situated entirely between the camera focal plane and the lens, and which has a large and a small opening which are caused to simultaneously traverse the camera focal plane in opposite directions in order to expose the film. In the present shutter, the availability of a selection of individual exposure openings on an endless curtain which peripherally encloses the film supply and transport apparatus, provides versatility in exposure selection when the slits are of different widths, as well as providing a capping function between exposures. Furthermore, the curtain may be provided with exposure slits having the same width, for uni-directionally driving the curtain for high speed, continuous shutter operation.

Structurally, the present camera is comprised of three major components, namely a lens housing structure (or lens "cone"), a camera body housing (or "body") which is removably mounted to the lens cone, and a film magazine housing (or "magazine") which is rigidly mounted in the body in such manner that it is easily removable therefrom for rapid film loading or changeover.

The lens cone houses the camera lens assembly which, in a preferred configuration, includes a remotely controlled iris diaphragm for regulating the size of the lens aperture. The lens cone is the supporting structure for the camera body, and is adapted to be mounted to an aircraft mounting station. External connection to a remote camera control unit, including power supply, can be provided by an electrical connector on the lens cone. A significant portion of the camera control logic circuitry can be housed in the lens cone, in addition to the lens assembly and iris diaphragm driving apparatus.

The camera body houses the complete focal plane shutter apparatus, which includes an endless loop curtain, or belt, adapted to travel along the periphery of a compartment for containing the magazine. The shutter curtain is supported in the camera body by four rollers, one of which is coupled to a shutter drive means for driving the curtain. The curtain drive roller includes sprockets at each end for engaging perforations along the curtain edges, for driving the curtain. The remaining three idler rollers permit curtain slippage thereon during acceleration and deceleration of the curtain, a condition which decreases curtain loading in the vicinity of the points of engagement of the curtain with the sprockets, thereby enhancing curtain life. Rotation of the drive roller can be either bi-directional or uni-directional, and the effective shutter speed is controlled by selecting one of plurality of exposure slits to traverse the photographic format provided by the magazine. The required electrical connections are made when the body is secured to the lens cone.

The magazine is insertable in the camera body, and contains the film spools, the film drive mechanism, and the film hold-down apparatus. In a preferred magazine embodiment, the film hold-down apparatus includes a vacuum platen, and a vacuum regulator is provided within the magazine and is adapted to be coupled to an exterior vacuum source when the magazine is inserted in the camera body. Further, electrical connection to the film drive apparatus is completed upon magazine insertion into the body.

The magazine is provided with a pair of guide rails for mating with a pair of guide tracks in the body, to facilitate the magazine's insertion into the camera body and its removal therefrom. A novel magazine insert locking device is provided in the magazine, for engagement with the camera body, which secures the magazine within the camera body. This magazine insert locking device operates to hold the magazine along the direction of magazine insertion, and automatically compensates for tolerance differences in particular magazines and bodies, in order to permit interchangeability between different bodies and different magazines. The locking and unlocking operations normally involve merely a quarter-revolution manual turn of an easily accessible knob.

When the magazine is locked in the camera body along the axis of insertion, it is further automatically locked to the body in two directions mutually orthogonal with the direction of magazine insertion, by means of a pair of spring loaded locking wedges located on the magazine which engage corresponding wedging surfaces on the camera body. The locking wedges each exhibit a compound locking taper and, in a preferred embodiment, are located on opposite sides of the magazine near its upper front portion. Auxiliary locking wedges are further provided at the bottom rear of the magazine, accomplished by tapering the ends of each of the magazine guide rails for engagement with corresponding tapers located at the termination of each of the tracks located in the camera body.

The complementary holding actions of the magazine insert locking device and the locking wedges, causes the magazine to be rigidly mounted in a precise location within the camera body, when locked by means of the magazine insert locking device. Vibration between the magazine and the camera body is avoided, so that the resulting enclosure remains completely light-tight during camera operation, and the platen is maintained in a precise position and orientation with respect to the camera lens cone.

The magazine of the present camera further includes a pair of identical film spool holding devices for holding the film spools in place while allowing the spools to rotate when driven by the film drive mechanism. The film spool holding devices are mounted in the front wall of the magazine and support the undriven ends of the spools. They further include an indicator mechanism for providing a visual indication of spool rotation during film transport.

The film spool holding device is characterized by the facility with which the film spools can be released from the magazine and inserted therein during darkroom unloading of exposed film and loading of live film. The device further includes a simple locking means for maintaining itself in the spool-holding attitude.

The provision of an easily removable, preloaded film magazine, together with the simplicity of operation of the various locking and holding mechanisms, allow the present camera to be reloaded inflight in a very short period of time by personnel unskilled in camera operation, as well as contributing to the ease with which darkroom film loading of the magazine can be performed. Furthermore, the endless loop, multiple slit shutter permits photographic versatility in addition to shutter longevity for substantially decreasing shutter failure and maintenance.

It is therefore a primary object of the present invention to provide a versatile, general purpose aerial camera which can be easily operated by personnel unskilled in camera procedures.

It is another object of the present invention to provide an aerial camera which can be reloaded in flight by personnel unskilled in camera operation.

It is a further object of the present invention to provide an aerial camera containing a removable film magazine which is easily and rapidly interchangeable with similar film magazines, for conveniently effecting inflight reloading.

It is yet another object of the present invention to provide means for securing a portable film magazine in a prescribed location within an aerial camera, which is simply operated for effecting magazine removal and installation.

It is still another object of the present invention to provide means for rotatably holding film spools in prescribed locations within a film magazine of an aerial camera, which is simply operated for effecting spool removal and installation in the magazine.

It is yet a further object of the present invention to provide means for securing film spools within a film magazine of an aerial camera, said means further including means for visually indicating spool rotation during camera operation.

It is another object of the present invention to provide a low inertia shutter for an aerial camera which has a relatively long shutter life.

It is a further object of the present invention to provide a shutter for an aerial camera which has a capability of providing a plurality of selectable exposure speeds.

It is still another object of the present invention to provide a shutter for an aerial camera having a plurality of different size exposure openings which are individually selectable for exposing a photograph in order to provide a plurality of exposure speeds, and further having the capability of providing a capping function between photographic exposures.

It is yet another object of the present invention to provide a shutter having a plurality of identical exposure openings which can be continuously operated for taking photographs in rapid succession.

It is yet another object of the present invention to provide a shutter having a plurality of different exposure openings, which can be continuously operated for taking photographs in rapid succession at different exposure speeds.

The novel features which are believed to be characteristic of the camera of the present invention, together with further objects and advantages thereof, will be better understood from the following description considered in connection with the accompanying drawings in which the camera and its various components are illustrated by way of example. It is to be expressly understood, however, that the drawings are for the purpose of illustration and description only and are not intended as a definition of the limits of the invention.

FIG. 1 is a perspective view of the camera of the present invention, with the film magazine partially removed;

FIG. 2 is a front elevation, partial block diagram of the camera shown in FIG. 1;

FIG. 3 is a perspective view of the focal plane shutter of the present invention, showing a preferred shutter curtain configuration;

FIG. 9 is a front view of the magazine insert locking device of the present invention;

FIG. 10 is a side sectional view of the locking portion of the magazine insert locking device of FIG. 9, taken along the line 10—10 in the direction of the appended arrows;

FIG. 11 is a side sectional view of the holding portion of the magazine insert locking device of FIG. 9, taken along the line 11—11 in the direction of the appended arrows;

Figure 4:
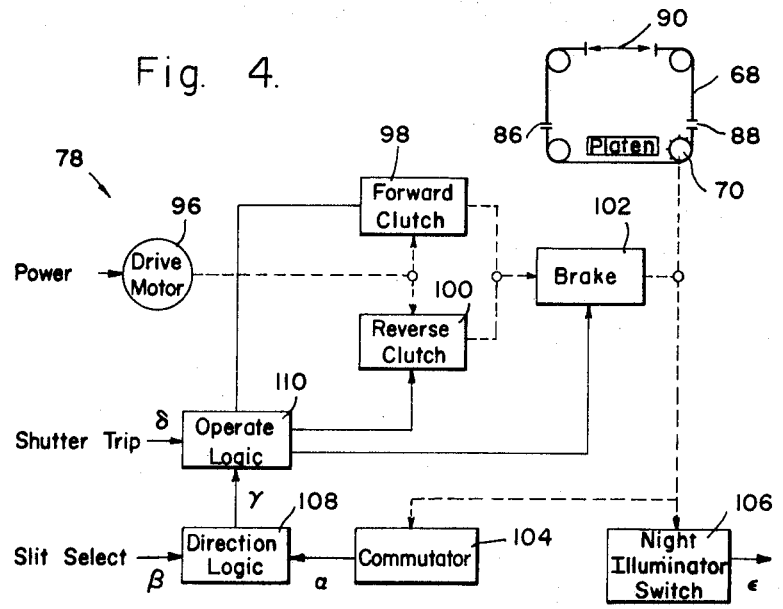
FIG. 4 is a block diagram of a preferred configuration of a shutter drive module included in the focal plane shutter shown in FIG. 3.

Preliminarily, it should be noted that the drawings contain therein a space coordinate reference system, for convenience of description, indicating $x$, $y$ and $z$ directions with respect to apparatus of the camera. When the aerial camera of the present invention is positioned over a terrain target, the $x$ direction is hereby defined as the direction of aircraft flight, the $y$ direction as being parallel to the camera optical axis (orthogonal to aircraft flight), and the $z$ direction as being mutually orthogonal to the $x$ and $y$ directions. Furthermore, because of the interrelation of various components of the camera, the drawings are somewhat repetitious with respect to such components, and corresponding components in different figures are designated by identical reference numerals.

Referring first to FIG. 1, there is shown an aerial camera according to the present invention which includes a lens housing or "cone" 10, a camera body 12, and a film magazine 14. The lens cone 10 is the supporting structure for the camera body 12, and contains thereon four pairs of mounting pads 16 (each pair located on a side) to provide the camera with a choice of mounting configurations with respect to an aircraft mounting station. An electrical connector (not shown) is also provided on the lens cone 10, for connecting the camera to a remote unit which transmits electrical power and operating control signals thereto.

The camera body 12 is positioned on the lens cone 10 by means of two integral guide pins (not shown) which append from the bottom of the body 12 and are received by a correspondingly located pair of holes at the top of the lens cone 10, and the body is secured to the lens cone by means of four latches 18.

The film magazine 14 is insertable in the camera body 12, and contains a pair of guide rails 20 (one rail being located along a side of the magazine 14) which slide along a pair of tracks located within the camera body 12, to facilitate magazine removal and insertion. The magazine 14 is shown in a partially removed condition in FIG. 1.

The film magazine 14 is provided with a magazine cover 22, which is removable from the magazine and capable of being locked thereto by means of a manually operated magazine cover lock 24. The magazine cover 22 encloses the top and the two sides of the magazine 14, and when in place, the interior of the camera is completely light-tight. The magazine front panel 26 is provided with a handle 28, for facility in removing the magazine 14 from the camera body 12, as well as for carrying the removed magazine. The magazine front panel 26 is further provided with adjustment and control knobs for a magazine insert locking device 30, as well as a film take-up spool holder 32 and a film supply spool holder 34, each of which is more fully described later.

The basic camera operations can be described with reference to FIG. 2. The lens cone 10 contains a lens assembly 36 which includes lenses 38, and can further include a removable iris assembly 40 having a diaphragm which is driven by a motor 42 for controlling the size of the lens aperture. Means are further provided for selecting aperture size from a remote control unit. The lens cone 10 can further contain a significant portion of the camera control logic circuits and power relays, in a lens cone electrical network 44.

The magazine 14 contains all the mechanical equipment for providing film transport, including hold-down, and with the cover installed thereon constitutes a light-tight, self contained enclosure for protecting the film during magazine removal and reinstallation. In one magazine configuration, a film supply spool 46 supplies film 48 to a photographic exposure position on the surface of a vacuum platen 50. The film 48 is pulled from the supply spool 46 by means of a driven metering roller 52, and the film is held in pressure contact with the metering roller 52 by means of a pressure or "pinch" roller 54 to ensure non-slippage of the transported film 48 with respect to the metering roller 52. The film is further guided by a pair of idler rollers 56, 58, and is gathered by a driven take-up spool 60. A film transport motor 62 is located within the magazine 14, and is coupled to a cycling rate apparatus (not shown) located on the rear wall of the magazine, for permitting a selection of film transport cycle rates. Furthermore, the film can be driven through a variable speed transmission (not shown), for causing the film to be transported at a speed which varies sinusoidally with time, thereby providing a simple image motion compensation capability to the camera.

The film 48 is flattened in the camera focal plane by means of the vacuum platen 50, which holds the film by means of a vacuum regulated by a vacuum regulator 64. A vacuum source is provided external to the camera, and is connected to the vacuum regulator 64 through a connector situated in the rear wall of the magazine 14, when the magazine 14 is inserted in the camera body 12.

A format mask 66 is positioned along the bottom of the magazine 14, and provides a rectangular opening at the camera focal plane which determines the size of the photographic format. When five-inch wide film is utilized, a convenient opening for the format mask is 4½ inches square, which provides 4½ inch square photographs having ¼ inch margins. Under these circumstances, the film transport apparatus pulls five inches of film during each photographic cycle.

The camera body 12 contains a focal plane shutter, which consists of a shutter curtain 68 which is adapted to be transported peripherally about the magazine 14, by means of a curtain drive roller 70, a first curtain idler roller 72, a second curtain idler roller 74, and a third curtain idler roller 76. A shutter drive module 78 is coupled to the curtain drive roller 70 for driving the curtain drive roller 70.

A preferred shutter curtain configuration is shown in FIG. 3. The curtain 68, which is an endless belt, is made of a flexible, light-impervious material, such as a thermoplastic polyester aluminum laminate, having a thickness of approximately 4 mils. It is supported in the camera by means of the four curtain rollers 70, 72, 74, 76, and is driven by the curtain drive roller 70 which contains sprockets 80 at each end thereof for engaging perforations 82 along the edges of the curtain 68 for ensuring positive and reliable curtain transport. The three idler rollers 72, 74, 76 are free wheeling to permit curtain slippage over the idler rollers during acceleration and deceleration of the curtain 68, which restricts the amount of inertia transmitted from the idler roller to the curtain during these periods. This limitation on curtain inertia restricts the inertial forces in the vicinity of the perforations 82 as they engage the sprockets 80, a condition which greatly enhances curtain life by decreasing the probability of curtain tearing at the perforations. The position of one of the idler rollers, such as the second idler roller 74, is adjustable by a roller adjustment means, for adjusting curtain tension.

The shutter curtain 68 contains a plurality of exposure openings, or slits, each having its longitudinal dimension in the $z$ direction. During a photographic exposure interval, a particular one of these slits is transported across the camera's photographic format as the curtain 68 is driven by the shutter drive module 78. For example, the preferred shutter curtain configuration shown in FIG. 3, contains thereon a first narrow exposure slit 86 and a second narrow exposure slit 88, in addition to a rectangular opening or wide exposure slit 90 which is at least as large as the camera's photographic format area. The distances between each of the slits is such that any two of them can be positioned in the $y$–$z$ planes on opposing sides of the format area (which is positioned in the $x$–$z$ plane) between exposure intervals, while the format area is covered or "capped" by a curtain portion betwen the oppositely positioned openings. For example, in the preferred curtain configuration, the first narrow exposure slit 86 and the second narrow exposure slit 88 can be positioned on opposite sides of the photographic format area, which is covered by the portion of the curtain 68 situated between the two slits; this condition is shown in FIG. 3. Alternately, one of the narrow exposure slits 86, 88 may be positioned at one side of the photographic format area, while the wide exposure slit 90 is positioned on the opposing side of the format area, while the portion of the curtain 68 situated therebetween is positioned over the photograph format area; this condition is presented when both of the narrow exposure slits 86, 88 have traversed the format area during consecutive cycles of camera operation, or when night-time photography is desired.

The purpose of the wide exposure slit 90 is for permitting night-time camera operation, at which time the shutter curtain 68 functions as a capping curtain. For example, during night-time operation, the curtain 68 is driven such that the rectangular opening comprising the wide exposure slit 90 is positioned over the photographic format area to completely open the format area to the lens assembly. At this point during curtain transport, a signal is originated in the shutter drive module which is sent to a flash unit, such as a stroboscope, which illuminates the terrain target for exposing the film in the photographic format. Curtain transport is continued, and the wide exposure slit 90 traverses the photographic format to be withdrawn therefrom, and the format is thereupon "capped" by the portion of the shutter situated between the wide exposure slit 90 and one of the narrow exposure slits 86, 88.

In the preferred shutter configuration, curtain transport is bi-directional across the photographic format, in order to permit consecutive exposures utilizing a particular exposure slit. The widths of the narrow exposure slits 86, 88 are determined from a consideration of shutter curtain velocity to provide a convenient range of effective shutter speeds. For example, a shutter capability covering an entire range of ambient daylight conditions (bright, hazy and dull) can be provided when an exposure time of $\frac{1}{1000}$ second is provided by the first narrow slit 86, and an exposure time of $\frac{1}{2000}$ second is provided by the second narrow slit 88. For a curtain velocity of 120 inches per second, therefore, the width of the first narrow slit 86 will be 0.060 inch, and the width of the second narrow slit 88 will be 0.120 inch. Since the iris diaphragm 40 (FIG. 2) is adjustable is provide a selection of lens aperture openings, these two shutter slit widths provide sufficient versatility for camera operation throughout the entire daylight range.

Movement of the shutter curtain 68 is controlled by the shutter drive module 78. A shutter module output gear 92 meshes with a shutter drive gear 94 which is coupled to the shutter drive roller 70, for driving the curtain 68. A block diagram of a preferred embodiment of the shutter control module 78, for operation with the preferred shutter curtain configuration, is shown in FIG. 4, in which solid and dashed lines are utilized for indicating electrical and mechanical couplings, respectively. Power is supplied (through the lens cone) to a drive motor 96 which simultaneously drives the inputs of a forward clutch 98 and a reverse clutch 100. The outputs of each of the clutches 98, 100 are coupled to a common output drive shaft which is coupled through a fail-safe brake 102. The brake 102 holds the output shaft stationary to avoid curtain creep when not functioning and when subjected to vibration, and requires the application of electrical power to release the braking action. The output drive shaft is coupled to the curtain drive roller 70, by means of the module output gear 92 meshing with the shutter drive gear 94, shown in FIG. 3.

The output shaft, in addition, drives a commutator 104, as well as a cam (not shown) which actuates a night illuminator switch 106 during nighttime operation. The commutator 104 functions as a shutter curtain position indicator and provides an electrical curtain position signal $\alpha$ to an input of a direction logic circuit 108 which, when a slit select signal $\beta$ is furnished thereto, provides a slit program signal $\gamma$ which designates the appropriate slit and direction for transport across the photographic format. The slit program signal $\gamma$ is applied to an input of an operate logic circuit 110 which, when a shutter trip signal $\delta$ is simultaneously applied thereto, energizes a selected one of the clutches 98, 100 in addition to energizing the brake 102, thereby causing a selected slit to be transported across the photographic format in a particular direction. The commutator 104 senses the end of the exposure period and causes the operate logic circuit 110 to deenergize the selected clutch and the brake, bringing the curtain velocity to zero. If a different slit is not selected, the output of the commutator 104 will cause the direction logic circuit 108 to program the same slit to travel in the opposite direction on the following cycle of camera operation.

During nighttime operation, the night illuminator switch 106 is actuated when the wide exposure slit 90 completely "covers" the photographic format area, and an illuminator signal $\epsilon$ is originated by the night illuminator switch 106 and is routed to the lens cone for activating an external source of illumination, such as a stroboscope or pyrotechnic devices which illuminate the target area. The film within the photographic format area is thereupon exposed, and transport of the wide slit 90 is continued until the shutter curtain 68 caps the format.

Shutter operation is commenced by the presence of the shutter trip signal $\delta$ to the operate logic circuit 110, and the shutter trip signal $\delta$ is originated in the magazine at a predetermined time in the film transport cycle. The slit select signal $\beta$ is originated in a remote control unit, exterior to the camera structure. The curtain 68 is provided with timing marks and is coupled to the sprocketed curtain and drive roller 70 in such manner that the positions of the exposure slits 86, 88, 90 are synchronized with the drive logic.

Both the shutter module 78 and the shutter curtain 68 are easily removably from the camera body, permitting other shutter embodiments to be utilized for tailoring a particular camera system to different photographic surveillance requirements. For example, in a first alternative shutter embodiment, the shutter module 78 can drive the shutter curtain 68 unidirectionally, and the shutter curtain 68 can contain thereon at least one shutter slit. When a plurality of shutter slits are included, they each have identical widths. The shutter module 78 continuously drives the shutter curtain 68 for high speed, continuous shutter operation.

In a second alternative shutter embodiment, the configuration of the shutter curtain 68 provides a plurality of exposure slits thereon, each of a different width. The shutter module 78 produces unidirectional curtain transport, and the slits are successively transported across the camera format area during each cycle of shutter operation, to produce a plurality of photographs (per shutter cycle), each of which have been exposed at different effective shutter speeds. The advantage of this second alternative shutter embodiment is that the camera operator is not required to make decisions concerning exposure values and shutter speeds, because the range in the variation of shutter slit widths can be selected to produce one photograph per shutter cycle which is correctly exposed, regardless of the ambient light conditions presented during a particular cycle of shutter operation.

Figure 5:
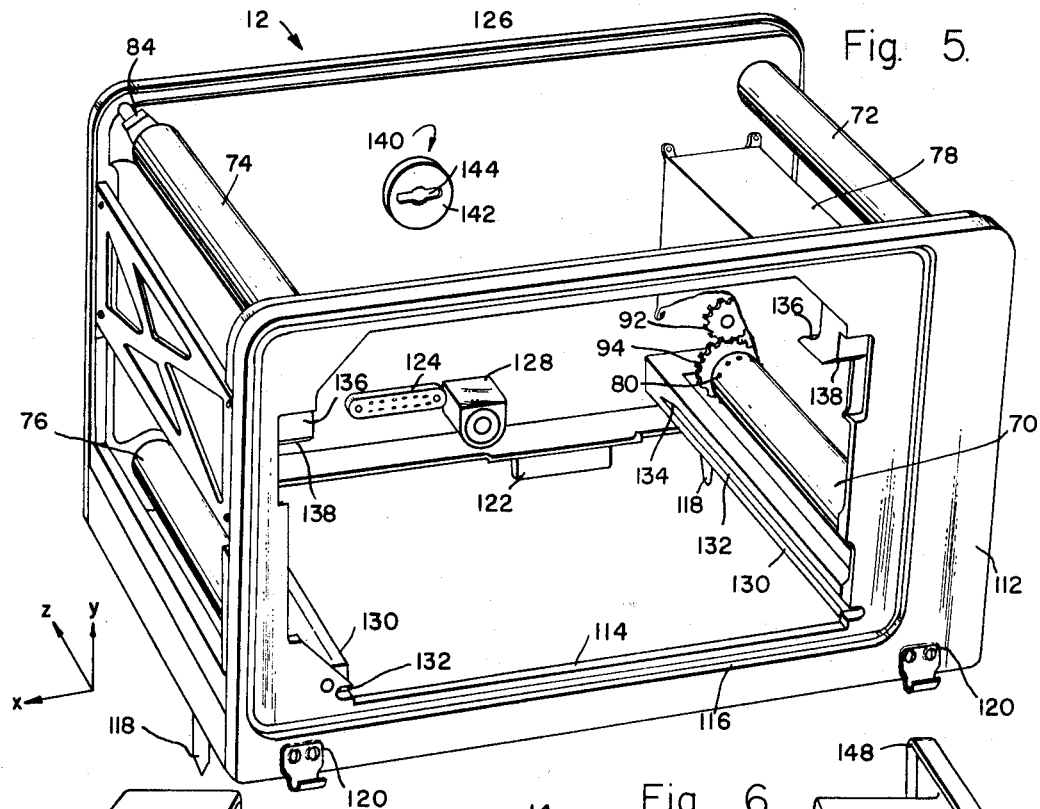
FIG. 5 is a perspective view of the camera body of the present invention.

Turning now to FIG. 5, the camera body 12 is shown with the shutter curtain (as well as the top and side panels) removed. A camera body front panel 112 contains a compartment opening 114 through which the film magazine can be inserted into the body 12. The front panel opening 114 is surrounded by a groove 116, into which a continuous lip around the magazine front panel is insertable for assisting in rendering the assembled camera light tight. It should be noted that the complete shutter apparatus, including the curtain rollers 70, 72, 74, 76 and the shutter drive module 78 (as well as the shutter curtain, not shown) is situated in the camera body 12 so as to permit an unobstructed compartment within the camera body for housing the film magazine.

A pair of guide pins 118 are located near opposite corners of the bottom of the camera body 12 which mate with corresponding guide apertures at the top of the lens cone. When the camera body 12 is positioned on the lens cone, guided by the guide pins 118, and secured thereon by means of four latches 18 (shown in FIG. 1) engaging each of four catches 120, a first electrical connector 122 situated at the bottom of the camera body 12 mates with a corresponding electrical connector situated in the lens cone. The mating of this first pair of electrical connectors allows electrical signals to be transmitted from the lens cone to the camera body 12, for distribution to the shutter drive module 78 and to a second electrical connector 124 which is situated on a rear wall 126 of the camera body. A vacuum connector 128 is also provided on the rear wall 126 of the camera body and leads to an exterior vacuum source. When the magazine is inserted into the camera body 12, the second electrical connector 124 mates with a corresponding electrical connector located in the rear wall of the magazine, for supplying electrical signals to the magazine's film transport apparatus. In addition, the vacuum connector 128 mates with a corresponding vacuum connector positioned at the rear of the magazine, for supplying a source of vacuum to the magazine's vacuum platen. Upon removal of the magazine from the camera body 12, the electrical and vacuum connections between the magazine and the body automatically disconnect.

The magazine is adapted to slide along a pair of tracks 130 during magazine insertion and removal. The tracks 130 are situated near the bottom of the camera body 12, on opposing sides of the magazine compartment, and each track 130 contains a groove 132 therein extending in the $z$ direction. The film magazine is provided with a pair of guide rails (described later) which slideably mate with the grooves 132 to support the magazine within the camera body 12. The ends of the grooves 132 near the body rear wall 126 are tapered to provide wedging surfaces 134; the function of these wedging surfaces 134 will be explained later.

A pair of wedging members 136, each having a compound wedging surface 138, are provided on opposing sides of the compartment opening 114. These wedging members 136 are component parts of a locking wedge device which secures the magazine in the x and y directions within the camera body 12, and will be described in greater detail later.

The rear wall 126 of the camera body 12 has secured thereon a magazine locking member 140, which can be a plate 142 extending from the body rear wall 126. The plate 142 contains an aperture 144 therein, having a contour which permits a laterally directed pin to be easily inserted through the aperture 144, but which retains the pin against the surface of the plate 142 obverse the body rear wall 126 when the pin (once inserted through the aperture 144) is rotated ninety degrees (i.e. longitudinally oriented in the y direction). The magazine locking member 140 is a component part of a magazine insert locking device which secures and locks the film magazine within the camera body 12, in the z direction.

Figure 6:
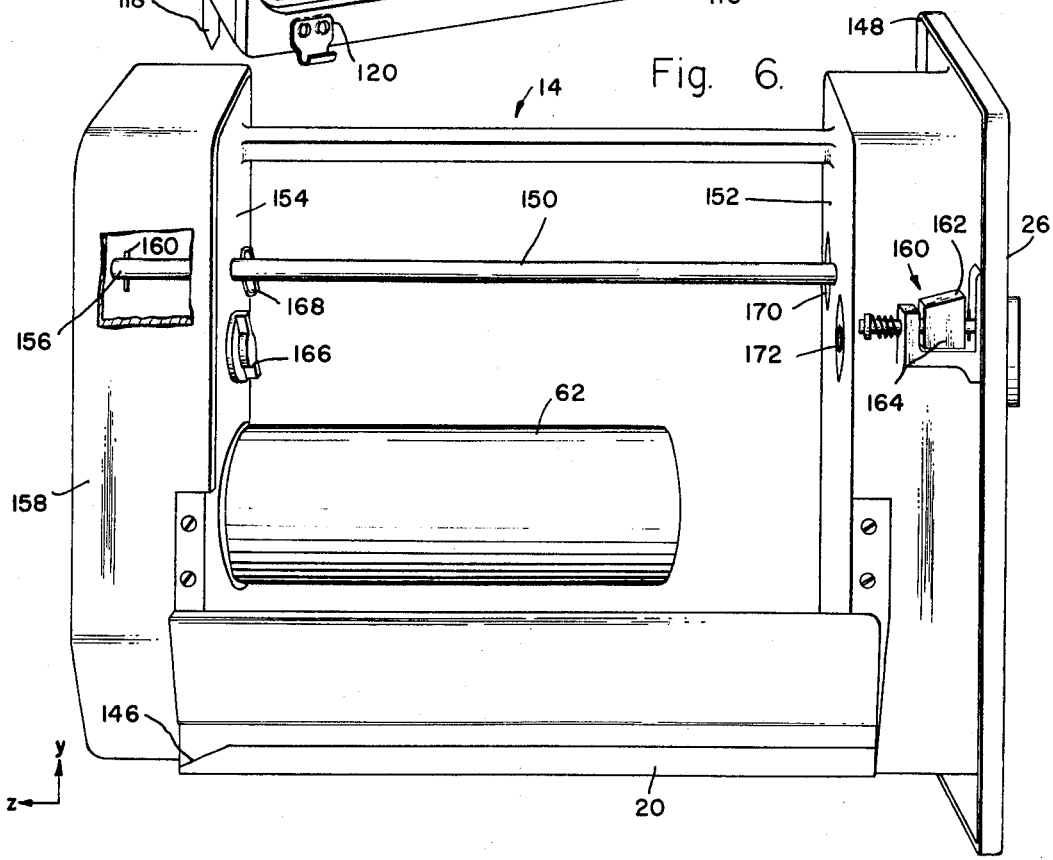
FIG. 6 is a side perspective view of the film magazine which is insertable in the camera body of FIG. 5.

Referring to FIG. 6, the film magzaine 14 is shown with the magazine cover and film spools removed. For convenience of description, the film transport rollers and vacuum hold-down apparatus are not shown. A guide rail 20 is provided on each side of the magazine 14, extending in the z direction, which is adapted to slide in the corresponding groove 132 of the tracks 130 located in the camera body 12, shown in FIG. 5. The rear end of each of the guide rails 20 is tapered to form a rail wedging surface 146. When the film magazine 14 is installed in the camera body 12, each of the rail wedging surfaces 146 is pressed against the corresponding track wedging surface 134 (FIG. 5), a condition which prevents further movement of the magazine 14 with respect to the body 12 in the z direction, as well as restraining y direction movement in the vicinity of the bottom rear portion of the magazine.

When the magazine 14 is installed in the camera body 12, a lip 148 surrounding the magazine front panel 26 is inserted in the body front panel groove 116 (FIG. 5) for rendering the front portion of the camera light-tight.

A magazine insert locking shaft 150 extends in the z direction from the magazine front panel 26, through a magazine front wall 152 and a magazine rear wall 154, and has a free end 156 extending into a magazine rear compartment 158. The shaft end 156 has a locking pin 160 attached thereto orthogonal the longitudinal axis of the locking shaft 150, and the locking shaft is adapted to be rotated through ninety degrees (producing corresponding rotation of the pin 160) in order to permit cooperation of the pin 160 with the magazine locking member 140 (FIG. 5). The magazine locking shaft 150 is a component part of a magazine insert locking device, which will be described in greater detail later.

Furthermore, installation of the film magazine 14 in the camera body 12 causes the magazine to be automatically secured to the body in the x and y directions by means of a pair of locking wedge mechanisms 160, each located on opposite sides of the front portion of the magazine. When the magazine is secured within the body in the z direction, a magazine compound wedging surface 162 of a locking wedge 164 bears against the corresponding body compound wedging surface 138 of the body wedging member 136 (FIG. 5); the locking wedge mechanism 160 will be described in greater detail later.

The film transport drive motor 62 is located within the magazine 14, and can be mounted to the magazine rear wall 154, for driving a film transport transmission (not shown) situated in the magazine rear compartment 158. The output of the film transport transmission can be utilized to drive the film metering roller, while a take-up spool holder 166, situated on the magazine rear wall 154, is also driven to gather exposed film. A "dragged" supply spool holder 168 is situated on the magazine rear wall 154, while a free wheeling supply spool holder 170 and a free wheeling take-up spool holder 172 are located in appropriate positions in the magazine front wall 152.

Figure 7:
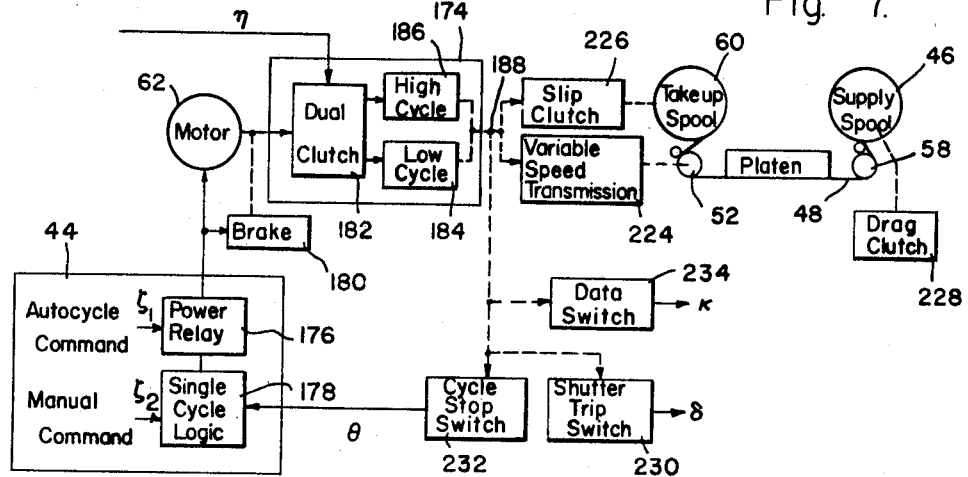
FIG. 7 is a block diagram of a film transport system included in the film magazine.

Turning to FIG. 7, there is shown a block diagram of a preferred configuration of a complete film transport system, in which solid and dashed lines are utilized to represent electrical and mechanical connections, respectively. The preferred configuration includes a dual cycling rate capability, provided by a cycling rate apparatus 174, which permits the film to be transported for taking pictures at a selected one of two possible rates. These two cycling rates can be designated "low" and "high," and in the preferred configuration, produces film transport cycles (and photographic exposures) at rates of 1 cycle per second and 4 cycles per second, respectively, although other cycling rates are possible.

The camera is further provided with an automatic operation capability, as well as being capable of providing single cycle operation in response to a manual command from a remote control unit. The desired operation is selected at the remote control unit, and either an automatic cycling (or "autocycle") command signal $\zeta_1$ or a manual command signal $\zeta_2$ is sent to the lens cone electrical network 44. Application of the autocycle command signal $\zeta_1$ directly energizes a power relay 176, while application of the manual command signal $\zeta_2$ energizes the power relay 176 through a single cycle logic circuit 178 to provide single cycle operation only. Energization of the power relay 176 provides electrical power to the film transport motor 62, as well as releasing a magazine brake 180 which is coupled to the motor output shaft to prevent film movement between cycles. The film transport motor 62 drives the cycling rate apparatus 174, which includes a dual clutch 182 coupled to a low cycle gear train 184 and to a high cycle gear train 186 for providing a selected cycling rate at a film transport drive shaft 188. The desired cycling rate is selected at a remote control unit, by providing (or witholding) a clutch energizing signal $\eta$ to the dual clutch 182. For example, when the clutch energizing signal $\eta$ is provided to the dual clutch 182, the resulting energization of the dual clutch 182 permits the high cycle gear train 186 to be driven by the motor 62, while deenergization of the dual clutch 182 permits the low cycle gear train 184 to be driven by the motor 62.

Figure 8:
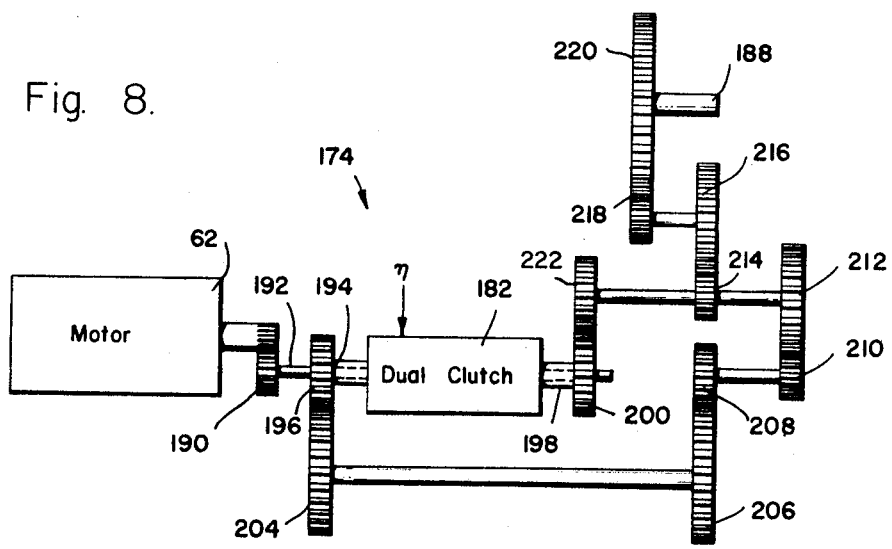
FIG. 8 is a diagram of a photographic cycling rate apparatus included in the film transport system of FIG. 7.

One configuration of the cycling rate apparatus 174 is shown in FIG. 8. A clutch input gear 190 is driven by the film transport motor 62, and drives a clutch input shaft 192. Depending upon the absence or presence of the clutch energization signal $\eta$, the clutch input shaft 192 is either coupled to a first clutch output shaft 194 (which is rigidly coupled to a first clutch output gear 196) or to a second clutch output shaft 198 (which is rigidly coupled to a second clutch output gear 200).

For example, when the clutch energization signal $\eta$ is not applied to the dual clutch 182, the first clutch output gear 196 drives the low cycle gear train which can include a driven first low cycle gear 204 to drive a second low cycle gear 206 which in turn meshes with a third low cycle gear 208 driving a fourth low cycle gear 210 which meshes with a fifth low cycle gear 212 to drive a first cycling rate output gear 214. A second cycling rate output gear 216 meshes with the first cycling rate output gear 214, to drive a third cycling rate output gear 218 which, in turn, meshes with a final cycling rate output gear 220 to drive the film transport drive shaft 188.

Similarly, when the clutch energization signal $\eta$ is applied to the dual clutch 182, the second clutch output gear 200 is driven, meshing with a first high cycle gear 222 which drives the first cycling rate output gear 214 and, accordingly, the film transport drive shaft 188.

Since the low cycle gear train is operable in the absence of the clutch energization signal $\eta$, a fail-safe feature is provided in that the low cycling rate will be maintained in the event of electrical power loss to the dual clutch 182. Furthermore, by appropriate design of the various gears, different low and high cycling rates and combinations thereof can be provided.

Returning to FIG. 7, the film transport drive shaft 188 drives a variable speed transmission 224, the output of which drives the film metering roller 52, for causing the film 48 to be transported during each cycle at a speed which varies with time. For example, the variable speed transmission 224 can drive the metering roller 52 at a sinusoidally varying speed (rapidly between exposure intervals and slowly during exposure intervals), thereby providing a simple image motion compensation capability to the camera. In addition, the take-up spool 60 is driven by the film transport drive shaft 188 through a slip clutch 226, providing compensation to rotational velocity of the take-up spool 60 as exposed film accumulates on the take-up spool, as well as maintaining film tension. An adjustable drag clutch 228 is coupled to the supply spool 46, for preventing free wheeling of the supply spool.

The film transport drive shaft 188, in addition, drives two separate cams, one for actuating a shutter trip switch 230, and the other for actuating a cycle stop switch 232. Actuation of the shutter trip switch 230 generates the shutter trip signal $\delta$, which is routed to the shutter drive module in the camera body. The shutter trip signal $\delta$ is provided once per photographic cycle, and is timed to precede a dwell period of the variable speed transmission 224 in order that exposure occurs at a predetermined film velocity. The cycle stop switch 232 generates a cycle stop signal $\theta$ once per photographic cycle, which is routed to the single cycle logic circuit 178 in the camera lens cone, for controlling camera logic to ensure proper timing for the stopping of film transport at the end of each photographic cycle.

In addition, a third cam can be driven by the film transport drive shaft 188, for actuating a data switch for generating a data initiate signal $\kappa$. The data initiate signal $\kappa$ occurs approximately at the beginning of each exposure period, and triggers an auxiliary data annotation system for applying relevant information to each photograph.

Turning now to FIGS. 9, 10, and 11, considered together, the magazine insert locking device 30 (to which reference has previously been made) is shown in detail. The magazine insert locking device 30 secures and locks the film magazine to the camera body, is simple to operate for both locking and unlocking the magazine to the body, and is adjustable so as to compensate for minor dimensional variations between different camera bodies and film magazines.

The front portion of the magazine insert locking device 30 is mounted to the magazine front panel 26 by means of a mounting member 234 (best shown in FIG. 10), a portion of which is inserted through an aperture 236 in the magazine front panel 26. The mounting member 234 is capable of a limited amount of movement with respect to the magazine front panel 26, in the z direction, but is restrained from rotational movement by means of a Woodruff key 238 situated in a keyseat 240 in the mounting member.

The mounting member 234 contains external threads 242 extending in the z direction, on a middle portion thereof. An adjustment ring 244 contains internal threads 246, and the mounting member 234 and adjustment ring 244 are in threaded engagement. A washer 248 is recessed in the adjustment ring 244 facing the magazine front panel 26, and projects slightly to provide sliding contact there between. When the adjustment ring 244 is manually rotated in the clockwise direction, the washer 248 slideably bears against the magazine front panel 26 and the mounting member 234 moves longitudinally opposite the z direction.

The locking shaft 150 extends longitudinally in the z direction through a central aperture 250 in the mounting member 234. A first end 252 of the shaft 150 is secured to a locking knob 254, such as by means of a locking nut 256. A longitudinally directed keyway 258, fitted with a key 260, causes the shaft 150 to be rotated in accordance with manual rotation of the locking knob 254. The locking knob 254 contains a pawl 262 which is pivotable about a pivot pin 264, and which is normally maintained in a first position by a biasing means such as a wire spring 266. The mounting member 234 contains thereon a peripheral locking ring 268 interrupted by an "OPEN" detent 270 and a "LOCK" detent 272. When the locking knob 254 has been rotated such that the pawl 262 is captured by the "OPEN" detent 270, the film magazine is in an unlocked condition and can be moved in the z direction with respect to the camera body. When the magazine is installed in the camera body, and the locking knob 254 is rotated such that the pawl 262 is captured by the "LOCK" detent 272, the magazine is secured to the camera body and locked in place.

The locking shaft 150 extends longitudinally through the magazine, in the z direction, and passes through an aperture 274 located in the magazine rear wall 154. The open space provided by the magazine rear wall aperture 274 is light sealed, such as by affixing a flexible, opaque washer 276 on the shaft 150 and within the aperture 274. A retaining ring 278 is secured to the shaft 150 in the vicinity of the aperture 274, exterior to the magazine rear wall 154, for assuring that the locking shaft 150 remains longitudinally positioned in the magazine and retains the mounting member 234 in the magazine front panel 26.

The free end 156 of the locking shaft 150 contains a locking pin 160 thereon, and has been previously described with respect to FIG. 6. The locking pin 160 cooperates with the magazine locking member 140, which has been previously described with respect to FIG. 5. When the pawl 262 is positioned in the "OPEN" detent 270, the locking pin 160 is free to pass through the magazine locking member apertures 144; however, when the locking knob 254 has been rotated such that the pawl 262 is captured by the "LOCK" detent 272, the locking pin 160 is retained against the interior surface of the magazine locking member plate 142.

When the locking pin 160 is inserted in the magazine locking member 140 and rotated ninety degrees, the pin (which is now directed along the y direction) is positioned against the interior surface of the plate 142. When the adjustment knob 244 is rotated in the counterclockwise direction, thereby moving the mounting member 234 and the locking shaft 150 opposite the z direction, the locking pin 160 is pressed against the magazine locking member 140, taking up any longitudinal slack between the film magazine and the camera body. Once the adjustment knob 244 has been set, it is generally not necessary to disturb the adjustment setting for subsequent magazine withdrawal and reinsertion with respect to a particular camera body, and the magazine insert locking device 30 can be opened and locked by removing the pawl 262 from one of the detents 270, 272, and manually depressing and turning the locking knob 254 ninety degrees until the pawl 262 automatically falls into the other detent. A locking knob biasing means, such as a spring washer 280 positioned between the magazine rear wall 154 and the retaining ring 278, biases the locking knob 254 in the z direction (when the locking shaft 150 is in an unlocked position) so that the pawl 262 remains in contact engagement with the locking ring 268.

Figure 12:
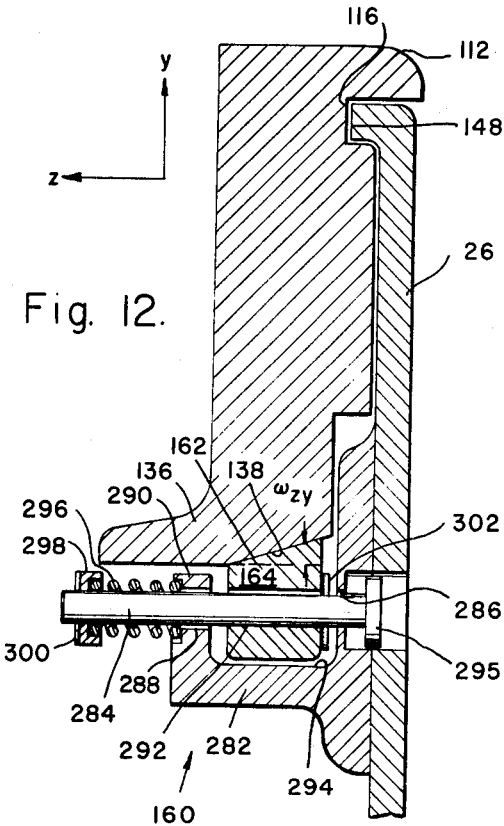
FIG. 12 is a side sectional view of a locking wedge device of the present invention.

Turning to FIG. 12, there is shown in detail a locking wedge mechanism 160, to which reference has been previously made on consideration of FIGS. 5 and 6. The locking wedge mechanism 160 shown in FIG. 12 is one of a pair of such locking wedge mechanisms, located on opposite sides of the magazine front panel 26, and which automatically operate to secure the film magazine to the camera body in the x and y directions when the magazine is secured to the body in the z direction by means of the magazine insert locking device.

The locking wedge mechanism 160 is mounted to the interior surface of the magazine front panel 26 by means of a wedge mounting member 282. A rod 284 is slideably supported in the z direction to the wedge mounting member 282, by being inserted in a pair of longitudinally directed apertures 286, 288 in the wedge mounting member 282, located adjacent the magazine front panel 26 and in a supporting arm 290, respectively. A locking wedge 164 contains an aperture 292 therein extending in the z direction, and is positioned on the rod 284 (which is inserted through the wedge aperture 292) between the magazine front panel 26 and the support arm 290. The locking wedge 164 is capable of a limited amount of rotation about the rod 284, permitted by a narrow gap 294 between the bottom of the locking wedge 164 and the bottom of the wedge mounting member 282.

The locking wedge 164 is normally biased in the z direction, although constrained by a light-tight end washer 295. For example, a helical spring 296 can be positioned on a portion of the rod 284 between the supporting arm 290 and the free end of the rod, held by a washer 298 constrained from z direction movement along the rod 284 by a first secured pin 300. A second pin 302 is secured to the rod 284 to prevent the wedge 164 from longitudinal movement with respect to the rod 284 opposite the z direction. When a force opposite the z direction is applied to the wedge 164, therefore, the wedge pushes the second pin 302 opposite the z direction, which in turn causes the rod 284 to move in the same direction, compressing the spring 296. In order for the wedge 164 to be maintained in a displaced position, a displacement force must act against the force provided by the spring 296.

Figure 13:
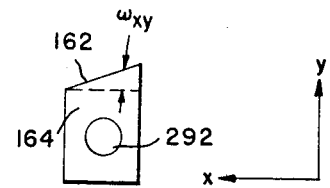
FIG. 13 is a front view of the locking wedge shown in FIG. 12.

The locking wedge 164 contains a compound wedging surface 162 which, when used in the z–y plane of FIG. 12, exhibits a first wedging angle $\omega_{zy}$. When the wedge 164 is viewed in the x–y plane, as in FIG. 13, the wedging surface 162 exhibits a second wedging angle $\omega_{xy}$. The locking wedge 164 shown in FIG. 13 is one of a pair of such locking wedges, as indicated previously. The other locking wedge, located on the opposite side of the magazine front panel, has a wedging surface which exhibits a second wedging angle $\omega_{xy}$ (in the x–y plane), but which is oppositely directed with respect to the locking wedge shown in FIG. 13. In one example of the locking wedges 164, $\omega_{zy}$ and $\omega_{xy}$ were 15° and 3°, respectively.

Returning to FIG. 12, the locking wedge mechanisms 160 each cooperate with a mating compound wedging surface 138 which is appropriately positioned on opposing sides of the camera body to mate with the corresponding wedging surface 162 of a locking wedge 164. When the film magazine has been inserted in the camera body, and the magazine insert locking device has been adjusted to produce tension in the locking shaft for securing the magazine to the body in the z direction, the body wedging surfaces 138 mate with the magazine wedging surfaces 162 to push each of the locking wedges 164 along its rod 284 opposite the z direction. The resulting compression in the spring 296 causes the mated wedging surfaces 138, 162 to bear hard against each other. This condition constrains movement between the film magazine and the camera body in the x and y directions. Accordingly, the magazine is automatically locked to the body in these directions by means of the locking wedge devices, when the magazine is secured to the body in the z direction.

Figure 14:
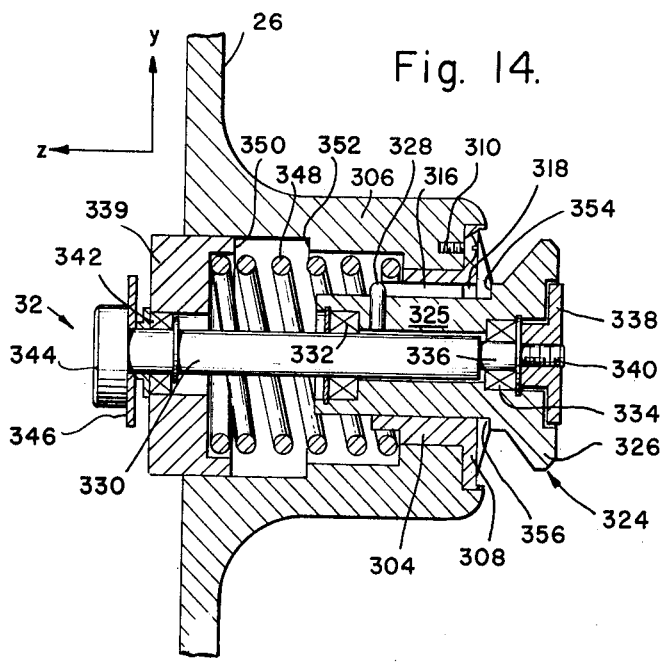
FIG. 14 is a side sectional view of a film spool holding device of the present invention.

Turning now to FIG. 14, a film take-up spool holder 32 is shown, which is identical to a film supply spool holder 34 indicated in FIG. 1. These film holders are positioned in the magazine front panel 26, and they hold the undriven ends of the film spools in place while the driven ends of the film spools are supported and driven by the film drive mechanisms previously described. The spool holders do not interfere with spool rotation, and further provides a visual indication of spool rotation which, accordingly, indicates film transport.

Figure 16:
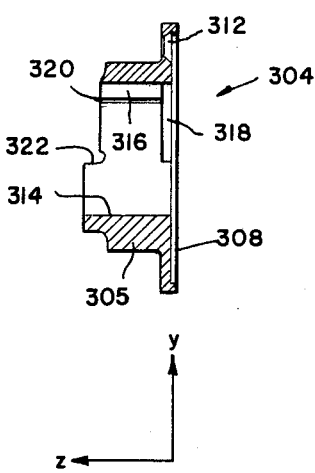
FIG. 16 is a side sectional view of the guide member shown in FIG. 15.
Figure 15:
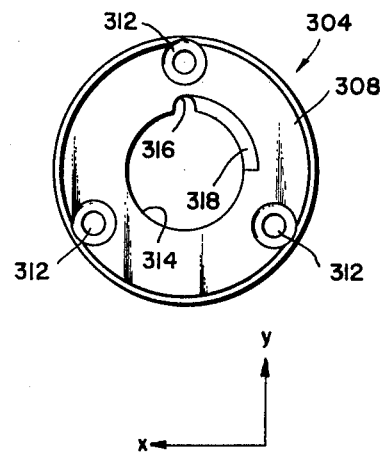
FIG. 15 is a front view of a guide member included in the film holding device of FIG. 14.

The spool holder 32 includes a guide member 304, more clearly shown in FIGS. 15 and 16 which are to be considered concurrently with FIG. 14. The guide member 304 includes a short cylindrical portion 305 rigidly mounted to a mounting barrel 306 which projects opposite the z direction from the magazine front panel 26, by means of a guide member flange 308 secured to the mounting barrel 306, for example by mounting screws 310 extending through flange apertures 312 and into the mounting barrel 306. The cylindrical portion 305 of the guide member 304 has an interior surface 314 which includes thereon a longitudinally directed guide channel 316. The flange end of the guide member cylindrical portion 305 contains a 90° recess 318 commencing with and adjoining the guide channel 316. The rear end of the guide member cylindrical portion 305 is provided with a 90° passageway 320 commencing with and adjoining the guide channel 316, and terminating with a detent 322.

A locking member 324, having a cylindrical portion 325 terminating in a spool release knob 326, is partially inserted in the guide member 304 and is adapted to slide longitudinally with respect to the guide member. A guide pin 328 is orthogonally secured to the locking member cylindrical portion 325, and projects into the guide channel 316 for guiding longitudinal movement of the locking member 324 with respect to the guide member 304.

A spindle 330 is rotatably supported along the cylindrical axis of the locking member 324 by means of a first bearing 332 and a second bearing 334 which are secured to the locking member 324. The second bearing 334 is in contact with a necked portion 336 of the spindle 330, which, in cooperation with an end nut 338 which is threaded to engage corresponding threads 340 at one end of the spindle 330, longitudinally secures to spindle to the inner race of the second bearing 334. Therefore, the locking member 324 and the spindle 330 are longitudinally locked together, but the spindle 330 is free to rotate about its longitudinal axis without transmitting rotation to the locking member 324 (and vice versa).

Similary, the spindle 330 is free to rotate about its longitudinal axis, through a cap 339 which is slideably mounted in the mounting barrel 306, while the spindle 330 and the cap 339 are longitudinally locked together. This condition is provided by a third bearing 340 which is coupled to both the spindle 330 and the cap 339.

A spool centering nub 344 and a spool seat 346 are attached to the end of the spindle 330 facing the interior portion of the film magazine, and cooperate with the undriven end of the film spool for positioning the spool along the longitudinal axis of the spindle 330. When the spool is driven, its contact with the spool seat 346 causes rotation of the spindle 330 which, in turn, rotates the end nut 338. A linear marking on the outer surface of the end nut 338 is provided as a visual indicator of spool rotation.

Biasing means, such as a helical spring 348, is provided between the cap 338 and the guide member 304, for maintaining the spool centering nub 344 and seat 346 in a spool holding position. When it is desired to release the film spool from the spool holder 32, the spool release knob 326 is rotated 90° counterclockwise, until the guide pin 328 is aligned with the guide channel 316. The spool release knob is then pulled opposite the z direction, guided by the guide pin 328 traversing the guide channel 316, which causes the spindle 330 to move longitudinally opposite the z direction. The resulting and corresponding movement of the cap 339 compresses the spiral spring 348 until an interior edge 350 of the cap 339 contacts a stop ledge 352 in the mounting barrel 306. At this point, the guide pin 328 has completely exited the guide channel 316, whereupon the spool release knob 326 is manually rotated 90° in the clockwise direction for causing the guide pin 328 to traverse the recess 318. The guide pin 328 is retained in the recess 318, and the spool centering nub 344 and seat 346 remain withdrawn within the mounting member 306, permitting the film spool to be either removed from the magazine or inserted therein.

When it is desired to lock a film spool in place, the driven end of the spool is appropriately positioned adjacent the magazine rear wall, and the undriven end of the film spool is held near the magazine front panel 26. The spool release knob 326 is rotated 90° in a counterclockwise direction, until the guide pin 328 enters the guide channel 316. At this point the biasing force of the spiral spring 348 pushes the cap 339 in the z direction, causing the spool centering nub 344 and seat 346 to engage the undriven end of the spool. The resulting and corresponding longitudinal movement of the spool release knob 326 (through longitudinal movement of the spindle 330) causes the spool release knob 326 to be biased away from the guide member 304 when the spool release knob approaches the guide member flange 308, for example by means of a spring washer 354 situated between the guide member flange 308 and an interior ledge 356 of the spool release knob 326. The spool centering nub 344 and seat 346 are longitudinally locked in the spool holding attitude, upon manually rotating the spool release knob 326 90° in the clockwise direction. Such rotation causes the guide pin 328 to pass over the passageway 320, and the biasing force of the spring washer 354 causes the guide pin to enter and be retained by the guide member detent 322.

Thus, there has been shown an aerial camera which is capable of permitting rapid film changeover during flight. The camera is characterized by an easily removable film magazine containing the film transport apparatus, and includes an easily operable magazine insert locking device which, in combination with a pair of locking wedge devices, secures the magazine within the camera body in all directions. The film spools are held in the magazine by means of a pair of spool holders which are easily operable for locking the spools therein, and for releasing the spools from the magazine when desired. A focal plane shutter has also been described, having an endless loop curtain which peripherally traverses the magazine when utilized in the present camera.

Other embodiments of the aerial camera of the present invention, as well as other embodiments and configurations of the shutter, spool holders and blocking mechanisms, and modifications of the embodiments and configurations herein presented, may be developed without departing from the essential characteristics thereof.

Accordingly, the invention should be limited only by the scope of the claims appended below.

What is claimed as new is:

1. An aerial camera comprising:
 (a) a camera housing containing therein an optical lens assembly having a focal plane, an opening to receive a film magazine and an endless shutter curtain surrounding said opening and adapted to traverse said focal plane; and
 (b) a portable film magazine, removably adapted for temporary installation of said magazine in said camera housing opening, said magazine including film transport apparatus having electric motor drive means adapted to be coupled to a source of electrical energy for transporting film across said focal plane when said magazine is installed in said camera housing.

2. An aerial camera according to claim 1, above, further including installation means for removably installing said magazine in said camera housing opening, said installation means comprising:
 (a) guide means extending in a first direction for guiding said magazine into said camera housing opening during installation therein and removal therefrom; and
 (b) securing means adapted to be manually controlled, for preventing relative movement between said magazine and said camera housing upon installation of said magazine in said camera housing, and alternatively for permitting said relative movement during removal of said magazine from said camera housing opening.

3. An aerial camera according to claim 2, above, wherein said guide means comprises:
 (a) track means secured to said camera housing and longitudinally extending in said first direction within said camera housing opening;
 (b) rail means secured to said magazine and longitudinally extending in said first direction without said magazine, for supportably and slidably engaging said track means; and
 (c) stop means for stopping first direction movement of said rail means with respect to said track means when said magazine is installed in said camera housing.

4. An aerial camera comprising:
 (a) a camera housing containing therein an optical lens assembly having a focal plane and a shutter curtain adapted to traverse said focal plane;
 (b) a portable film magazine, said magazine removably adapted for temporary installation in said camera housing, said magazine including film transport apparatus having electric motor drive means adapted to be coupled to a source of electrical energy for transporting film across said focal plane when said magazine is installed in said camera housing; and
 (c) installation means for removably installing said magazine in said camera housing, said installation means including guide means extending in a first direction for guiding said magazine in said camera housing during installation therein and removal therefrom, and securing means adapted to be manually controlled, for preventing relative movement between said magazine and said camera housing upon installation of said magazine in said camera housing, and alternatively for permitting said relative movement during removal of said magazine from said camera housing; said securing means comprising:
 (d) manually controlled magazine insert locking means for securing said magazine in said camera housing opposite said first direction; and
 (e) locking wedge means for automatically securing said magazine in said camera housing in a second direction orthogonal said first direction and in a third direction mutually orthogonal said first and second directions, when said magazine is installed in said camera housing and secured by said magazine insert locking means.

5. An aerial camera according to claim 4, above, wherein said magazine insert locking means includes:
 (a) a shaft member having a longitudinal axis extending in said first direction and rotatably mounted to said magazine;
 (b) a locking member secured to said camera housing and intercepting said longitudinal axis, said shaft member adapted to cooperate with said locking member for preventing longitudinal movement of said shaft member opposite said first direction when said magazine is installed in said camera housing and said shaft member is rotated about said longitudinal axis through a predetermined angle; and
 (c) means for manually rotating said shaft member about said longitudinal axis through said predetermined angle.

6. An aerial camera according to claim 5, above, wherein said magazine insert locking means further includes adjustment means for adjusting the position of said shaft member along said longitudinal axis for assuring cooperation between said shaft member and said locking member.

7. An aerial camera according to claim 4, above, wherein said locking wedge means includes:
 (a) a first wedging member slideably mounted to said magazine opposite said first direction and having a first wedging angle including components in said first, second and third directions;
 (b) a second wedging member slideably mounted to said magazine opposite said first direction and having a second wedging angle including components in said first and second directions and opposite said third direction:
 (c) biasing means for biasing said first and second wedging members in said first direction;
 (d) a third wedging member rigidly mounted to said camera housing and positioned obverse said first wedging member, and having a third wedging angle complementing said first wedging angle, for mating with said first wedging member when said magazine is installed in said camera housing; and
 (e) a fourth wedging member rigidly mounted to said camera housing and positioned obverse said second wedging member, and having a third wedging angle complementing said first wedging angle, for mating with said first wedging member when said magazine is installed in said camera housing; and

References Cited
UNITED STATES PATENTS

| | | | |
|---|---|---|---|
| 2,596,222 | 5/1952 | Doyle | 95—12.5 |
| 2,713,814 | 7/1955 | Sonne | 95—12.5 |
| 2,931,284 | 4/1960 | Vinten | 95—12.5 XR |
| 3,223,011 | 12/1965 | Hunt | 95—31 XR |
| 3,296,949 | 1/1967 | Bounds | 95—12.5 XR |

JOHN M. HORAN, Primary Examiner

LEO H. McCORMICK, Jr., Assistant Examiner

U.S. Cl. X.R.

95—31, 57